May 29, 1962 J. H. TARRANT ET AL 3,036,512
COFFEE BREWER
Filed Jan. 3, 1961

JAMES H. TARRANT
ROBERT B. ANDERSON
INVENTORS

BY *Lyon & Lyon*
ATTORNEYS

United States Patent Office 3,036,512
Patented May 29, 1962

3,036,512
COFFEE BREWER
James H. Tarrant, Los Angeles, and Robert B. Anderson, Altadena, Calif., assignors to Western Urn Manufacturing Company, Los Angeles, Calif., a corporation of California
Filed Jan. 3, 1961, Ser. No. 80,174
3 Claims. (Cl. 99—300)

This invention relates to coffee brewers, more particularly to the type of coffee brewer disclosed in Patent No. 2,881,693, issued April 14, 1959, to D. M. Wells et al.

Included in the objects of this invention are:

First, to provide a coffee brewer having a water heater tank connected to a water supply line, from which water is withdrawn during the brewing cycle, and, a novel means whereby, when the water is being heated between withdrawals of water from the heater tank, the tank is isolated from the water supply and vented to atmosphere so that the water pressure in the tank is essentially at atmospheric pressure, but when hot water is being withdrawn, the vent to atmosphere is closed and the tank is connected to the water supply so as to receive an additional charge of water.

Second, to provide a coffee brewer of this class wherein the venting means for the heater tank includes an overflow collector for water overflowing from the heater tank due to expansion of the water as it is heated, and means for draining the overflow water into the coffee brewing compartment along with brewing water from the heater tank during the brewing cycle.

With the above and other objects in view, as may appear hereinafter, reference is directed to the accompanying drawings in which.

Figure 1:
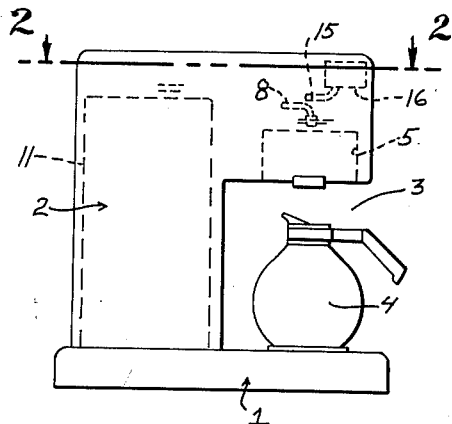
FIGURE 1 is a reduced side view of the brewing apparatus.
Figure 3:
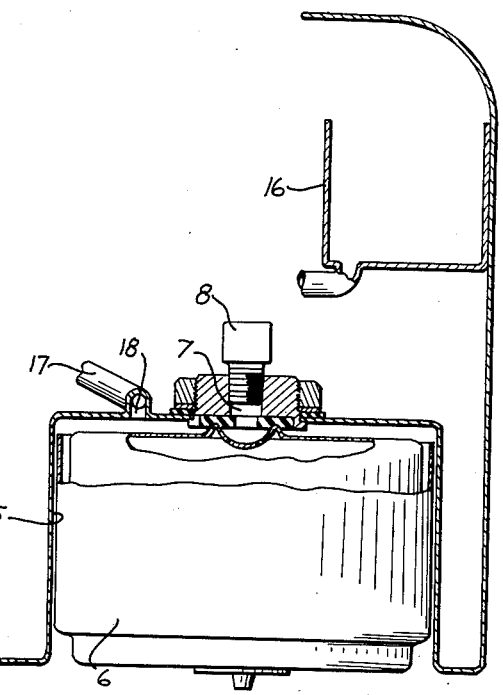
FIGURE 3 is a fragmentary sectional view thereof taken through 3—3 of FIGURE 2.

The present invention is adapted for use with the type of coffee brewer disclosed in the aforementioned Patent 2,881,693. However, the invention is adaptable to other types of coffee brewers. The coffee brewer includes a base 1 upon which is mounted a housing 2 comprising a pedestal portion and upper laterally extending portion. The laterally extending portion defines with the forward portion of the base 1 a space 3 adapted to receive a coffee vessel 4. Above the space 3 the underside of the housing 2 is provided with a brewing unit recess 5 adapted to receive a brewing unit 6 of the type shown in the aforementioned patent. A brewing water nozzle 7 is mounted in the upper wall of the brewing unit recess for delivery of water to the brewing unit 6.

The brewing water nozzle 7 is connected to a brewing water line 8 which in turn is connected to a source of water under pressure not shown. Mounted within the housing 2 and interposed in the brewing water line 8 in downstream succession is a pressure regulator 9, a solenoid shutoff valve 10, a heater tank 11 and a diverter solenoid valve 12.

Figure 2:
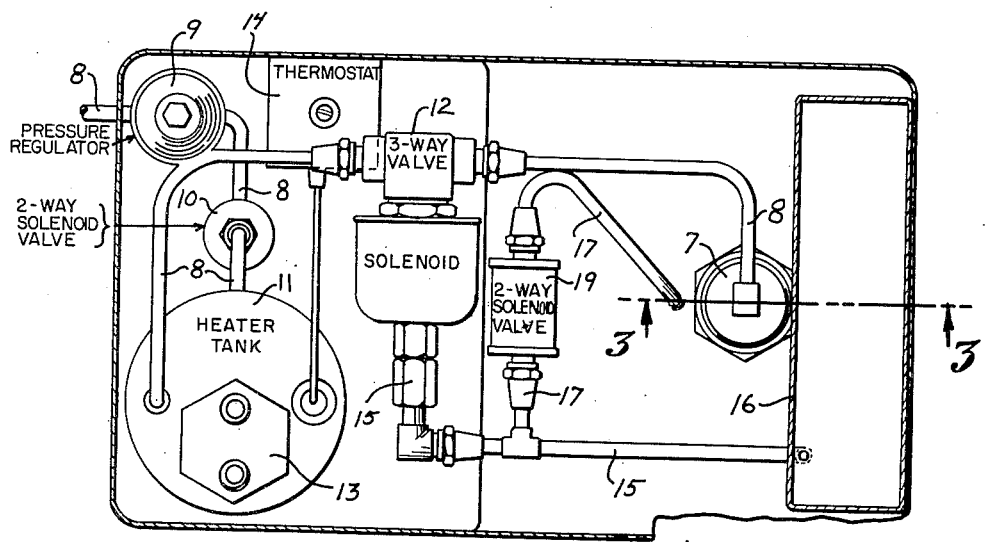
FIGURE 2 is an enlarged transverse sectional view thereof taken through 2—2 of the FIGURE 1 showing the major elements of the brewing apparatus, the electrical connections therebetween being omitted to simplify the illustration.

The heater tank is equipped with a conventional immersion heater 13, the upper or terminal end of which is indicated in FIGURE 2. A suitable thermostat 14 is also connected with the heater tank.

The solenoid diverter valve 12 is a three-way valve and is connected to an expansion line 15 in such a manner that the upstream portion of the brewing water line 8 may be connected alternatively to its downstream portion leading to the brewing water nozzle 7 or connected to the expansion line 15. Supported within the housing 2 at an elevation above the brewing water nozzle 7 is an overflow collector 16 in the form of an upwardly open container. The expansion line 15 is joined to the underside of the overflow collector 16. A drain line 17 branches from the expansion line 15 and terminates in a discharge opening 18 located in the upper wall of the brewing unit recess 15 at one side of the brewing water nozzle 7. Interposed in the drain line 17 is a shutoff solenoid valve 19. Operation of the coffee brewer is as follows:

A brewing unit 6 containing a charge of coffee is inserted in the brewing unit recess 5 and a coffee vessel 4 is placed thereunder. Between brewing operations the shutoff solenoid valve 10 and the shutoff solenoid valve 19 are closed and the solenoid diverter valve 12 occupies a position in which the downstream portion of the brewing water line 8 is closed but the expansion line 15 is open. As a consequence, the interior of the heater tank 11 is exposed to atmospheric pressure through the expansion line 15. As the water in the tank 11 is heated it expands and the excess water flows upwardly through the expansion line 15 to the overflow collector 16. The amount of water collected is relatively small; however, should this water be trapped in the heater tank 11 the condition of excessive pressure would be created in the heater tank.

Provided it is desired to initiate the brewing cycle the operator presses a button, not shown, which operating through a suitable relay opens the two shutoff valves 10 and 19 and causes the diverter valve 12 to open the brewing water line 8 and close the expansion line 15. The heated brewing water then flows into the brewing unit 6 through the nozzle 7. It is conventional in coffee brewers to provide either a timing switch to terminate the flow of brewing water or to provide a weight-operated switch sensitive to the weight of coffee in the coffee vessel 4 to terminate the flow of brewing water. It is immaterial to the present invention what system is used to terminate the flow of brewing water.

During the period of flow of the brewing water any water which has been previously collected in the overflow collector 16 drains through the drain line 17 and solenoid valve 19 into the brewing unit 6. During the brewing period fresh water has entered the heater tank 11. Upon the completion of the brewing period, the solenoid valves are deenergized and move to their normally closed positions in the case of the valves 10 and 19 and the diverter valve 12 again returns to a position connecting the expansion lines 15 with the heater tank.

It will be observed that when the solenoid valves are in their deenergized condition the heater tank 11 is vented and the water as it heats is free to expand into the overflow collector 16. The only period in which the tank is subjected into pressure is during the brewing period and at such time is subjected only to the pressure as determined by the regulator 9 less the pressure drop in the brewing water line 8 by reason of the flow of water from the brewing water nozzle 7. It will thus be seen that the heater tank is at no time subjected to high pressure and therefore can be constructed of relatively inexpensive light gage metal. This not only reduces the cost of the tank and the weight of the coffee brewing apparatus but more particularly eliminates the danger inherent in a high pressure tank.

As indicated previously the amount of water normally collected in the overflow collector 16 is relatively small and in fact is of such small volume with respect to the total amount of brewing water that even if the water drained from the collector were cooled it has no noticeable effect on the over-all temperature of the brewing water.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. A coffee brewing apparatus, comprising: a brewing unit; a brewing water flow line connected with a source of water under pressure and adapted to discharge into said brewing unit; a heater tank, and control valve means therefor interposed in said flow line; said valve means operable to isolate said heater tank from the flow line upstream thereof and to vent said tank to atmosphere; and operable to permit flow of brewing water through said flow line and heater tank for discharge into said brewing unit; means for collecting excess water from said heater tank when said tank is vented to atmosphere; and means for discharging water from said collecting means into said brewing unit simultaneously with flow of water through said flow line.

2. A coffee brewing apparatus, comprising: a brewing unit; a brewing water flow line connected with a source of water under pressure and adapted to discharge into said brewing unit; an overflow collector disposed at a level above said brewing unit; an overflow line leading to said collector; a drain line leading from said collector to said brewing unit; a shutoff valve disposed in said flow line upstream of said heater tank; a diverter valve disposed in said flow line downstream of said heater tank and connected with said overflow line; said valves being operable jointly to isolate said heater tank from the upstream side of said flow line and connect said heater tank with said overflow line and collector, and also operable jointly to permit flow of brewing water through said flow line and heater tank to said brewing unit; and means operable during flow of brewing water to drain water from said collector to said brewing unit.

3. In a coffee brewing apparatus having a brewing unit, a flow line from source of water under pressure to said brewing unit, and a heater tank and valve means interposed in said flow line, said valve means being operable to cause flow through said flow line and heater tank to said brewing unit, and also operable to isolate said heater tank from the portion of said flow line upstream thereof, and simultaneously open said heater tank through a vent line to atmospheric pressure, the combination of means for effecting removal of the excess water from said heater tank produced by expansion of the water when heated, said means comprising: a collector terminating said vent line adapted to receive and hold said excess water; and means, operable during flow of water to said brewing unit for discharging the water from said collector into said brewing unit.

References Cited in the file of this patent

UNITED STATES PATENTS

| | | |
|---|---|---|
| 1,437,187 | MacDonald | Nov. 28, 1922 |
| 2,692,732 | Lieberman | Oct. 26, 1954 |
| 2,881,693 | Wells | Apr. 14, 1959 |